United States Patent [19]

Häuslein

[11] Patent Number: 4,825,042
[45] Date of Patent: Apr. 25, 1989

[54] CONTINUOUS FLOW HEATER ASSEMBLY FOR A BEVERAGE MAKER

[75] Inventor: Reinhard Häuslein, Minden, Fed. Rep. of Germany

[73] Assignee: Melitta-Werke Bentz & Sohn, Minden, Fed. Rep. of Germany

[21] Appl. No.: 82,159

[22] Filed: Aug. 6, 1987

Related U.S. Application Data

[63] Continuation-in-part of Ser. No. 737,408, May 24, 1985, abandoned.

[30] Foreign Application Priority Data

May 24, 1984 [DE] Fed. Rep. of Germany ....... 3419365

[51] Int. Cl.$^4$ .......................... H05B 3/00; F24H 1/10; A47J 31/00
[52] U.S. Cl. ..................................... 219/283; 99/288; 99/307; 219/298; 219/301; 219/302
[58] Field of Search ................ 219/280–283, 219/296–299, 301–308, 328; 99/279, 281, 288, 295, 306, 307

[56] References Cited

U.S. PATENT DOCUMENTS

| 1,077,035 | 10/1913 | Boyer | 219/304 X |
| 2,307,924 | 1/1943 | Gillespie | 219/298 X |
| 3,592,125 | 7/1971 | Tolmie et al. | 99/295 X |
| 4,178,842 | 12/1979 | Vitous | 99/281 X |
| 4,303,827 | 12/1981 | Kyles | 219/283 X |
| 4,334,141 | 6/1982 | Roller et al. | 219/283 |
| 4,356,381 | 10/1982 | Flaherty et al. | 99/288 X |
| 4,371,777 | 2/1983 | Roller et al. | 219/283 X |

FOREIGN PATENT DOCUMENTS

| 143117 | 6/1985 | European Pat. Off. | 219/283 |
| 2647152 | 4/1978 | Fed. Rep. of Germany | 219/301 |
| 2701692 | 7/1978 | Fed. Rep. of Germany | 219/283 |
| 2757109 | 6/1979 | Fed. Rep. of Germany | 219/301 |
| 2839140 | 3/1980 | Fed. Rep. of Germany | 219/283 |
| 3419365 | 9/1985 | Fed. Rep. of Germany | 219/301 |
| 3424469 | 1/1986 | Fed. Rep. of Germany | 219/301 |
| 1328371 | 6/1971 | United Kingdom | 219/296 |
| 1427586 | 3/1976 | United Kingdom | 219/301 |
| 1515951 | 6/1978 | United Kingdom | 219/283 |
| 2062822 | 5/1981 | United Kingdom | 99/280 |

*Primary Examiner*—Anthony Bartis
*Attorney, Agent, or Firm*—Spencer & Frank

[57] ABSTRACT

A beverage maker includes a continuous flow electric heater assembly of tubular construction adapted to be connected to a source of fresh water and is arranged for guiding fresh water therethrough for heating the fresh water to brewing temperatures, and a filtering vessel and pipe arrangement to introduce heated fresh water from the heater assembly to the filtering vessel. The heater assembly comprises at least two tubular continuous flow electric heaters each being bent into a U-shaped configuration. The heaters are arranged in a generally horizontally juxtaposed mutually nested relationship and each has a metal heater tube containing an electric heating element, a metal water pipe extending adjacent the metal heater tube parallel therewith and a heat conducting flat web connecting the heater tube with the water pipe for transferring heat from the heater tube to the water pipe. There is further provided a tubular connector coupling the water pipes of the heater assemblies to one another.

20 Claims, 5 Drawing Sheets

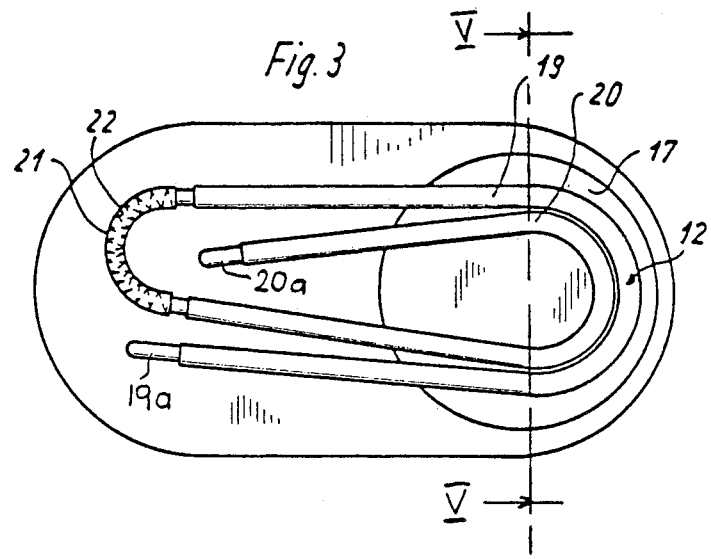
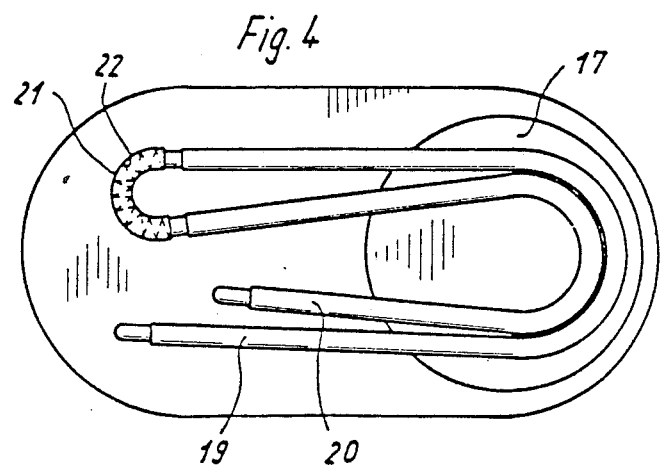

4,825,042

CONTINUOUS FLOW HEATER ASSEMBLY FOR A BEVERAGE MAKER

CROSS REFERENCE TO RELATED APPLICATION

This is a continuation-in-part of application Ser. No. 06/737,408 filed May 24, 1985, now abandoned.

BACKGROUND OF THE INVENTION

This invention relates to a coffee maker or tea maker (hereafter beverage maker) in which fresh water is caused to pass through a heater for being heated to brewing temperatures and is advanced into a filtering vessel in an ascending feed pipe.

In making beverages such as coffee or tea it is a desideratum to introduce the brewing water into the filtering vessels as rapidly a possible.

In known beverage makers, for heating the fresh water, continuous flow heaters of generally relatively high heat output are used. The heat output is adapted to the capacity of the beverage maker. Accordingly, in machines which are capable of delivering a relatively large quantity of cups of the beverage the heat output of the continuous flow heater is relatively high, whereas in smaller machines the continuous flow heater has a relatively low heat output. In each instance the heat output of the continuous flow heater is thus adapted to the designed capacity of the beverage maker and has a fixed constant value.

In determining the required heat output of the heater, a compromise has to be found between the heat output and the particular machine configuration which is generally predetermined by a designer. The greater the heat output of the continuous heater, the larger the external dimensions of the machine, so that frequently it is not feasible to install a continuous flow heater of very high heat output in a beverage maker of predetermined configuration.

SUMMARY OF THE INVENTION

It is an object of the invention to provide an improved beverage maker of the above-outlined type such that a heater of relatively high heat output may be accommodated in the smallest possible space.

More particularly, it is an object of the invention to provide an improved beverage maker of the above-outlined type such that by means of an electric heater having an output of 1400-1600 W, the water may be heated to a temperature of 95° C. ±3° C. For obtaining such a result, it is necessary to maintain the specific heat (load) applied to the water to be heated as low as possible, for example, 5-8 W/cm². If conventional continuous tubular flow heaters were to be used to achieve these desiderata, heaters of such dimensions would be needed that they would not fit into the usual household-size beverage maker machines.

Therefore, the above-outlined objects and others to become apparent as the specification progresses, are accomplished by the invention, according to which, briefly stated, the heater assembly of the beverage maker comprises at least two tubular continuous flow electric heaters each being bent into a U-shaped configuration. The heaters are arranged in a mutually nested relationship and each has a metal heater tube, a metal water pipe extending adjacent the metal heater tube parallel therewith and a heat conducting coupler connecting the heater tube with the water pipe for transferring heat from the heater tube to the water pipe. There is further provided a tubular connector coupling the water pipes of the heater assemblies to one another.

The invention is based on the recognition that two tandem-arranged continuous flow heaters structured as outlined above, result, as a whole, in a heater assembly of relatively high output, but do not have the disadvantageously large spatial requirement of a single, conventionally configured continuous flow heater having the same heat output.

BRIEF DESCRIPTION OF THE DRAWING

FIG. 3 is a bottom plan view of a preferred embodiment as viewed in the direction of the arrow III of FIG. 1, with a base plate component removed.

FIG. 4 is similar to FIG. 3 and shows a bottom plan view of another preferred embodiment of the invention.

DESCRIPTION OF THE PREFERRED EMBODIMENTS

Figure 1:
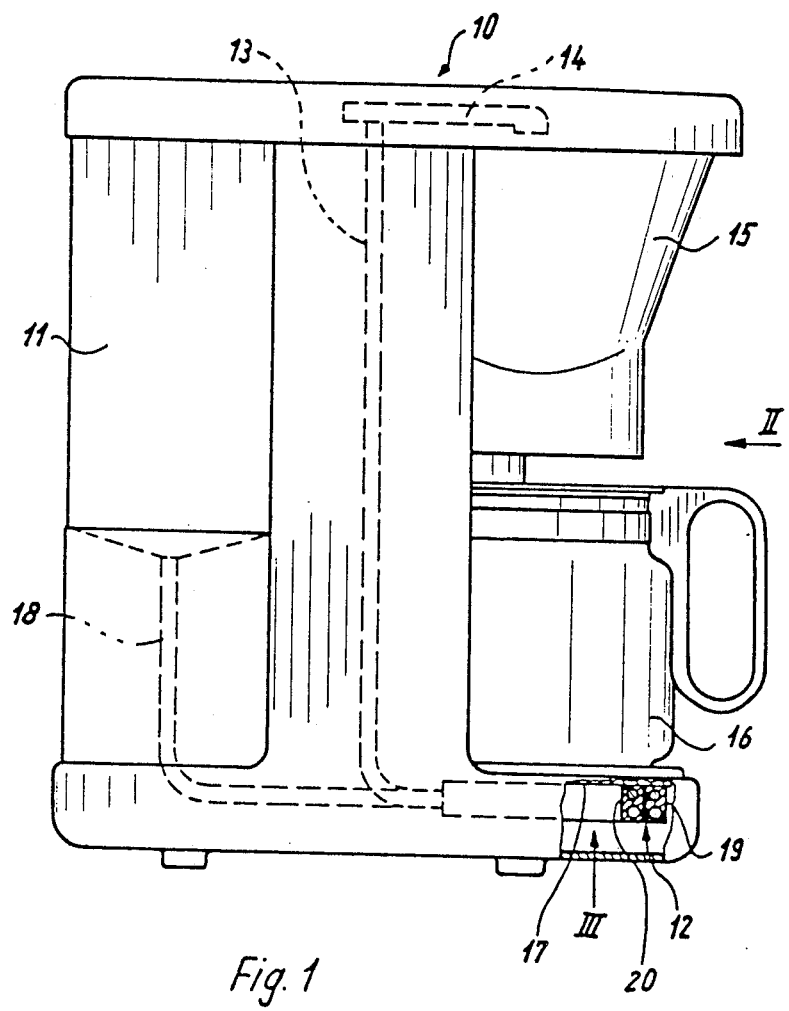
FIG. 1 is a partially sectional side elevational view of a beverage maker incorporating the invention.
Figure 2:
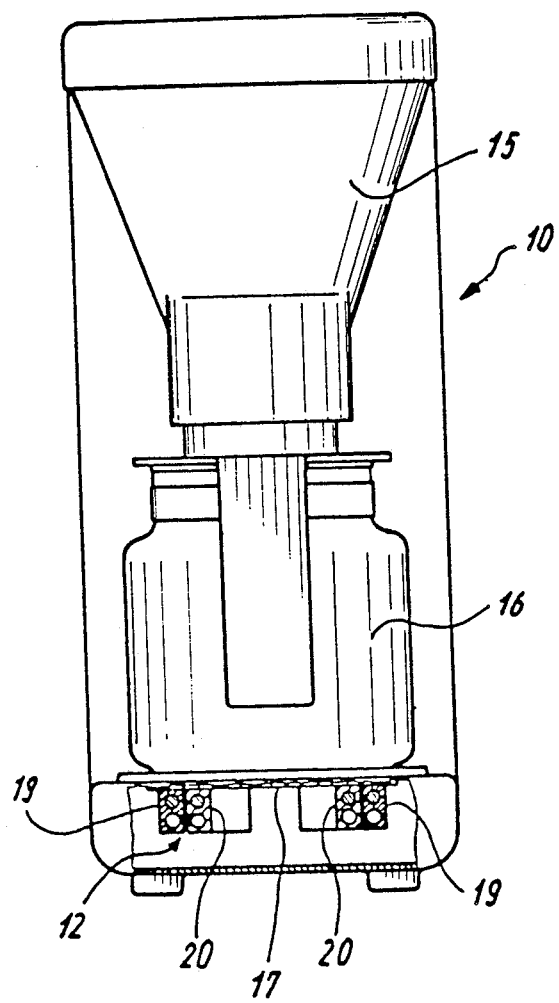
FIG. 2 is a partially sectional end elevational view of the construction shown in FIG. 1, taken in the direction of arrow II of FIG. 1.

Turning now to FIGS. 1 and 2, the beverage maker shown therein and generally designated at 10 includes a fresh water reservoir 11, a heater assembly 12, an ascending feed pipe 13, a horizontal end pipe 14 adjoining the feed pipe 13, a filtering vessel 15 and a pot 16 which may be positioned on a hot plate 17. The fresh water vessel 11 is coupled with the heater assembly 12 by means of a connecting pipe 18.

Fresh water accommodated in the fresh water vessel 11 is, upon energization of the heater assembly 12, heated by the latter and delivered through the ascending feed pipe 13 and the end pipe 14 into the filtering vessel 15.

Referring to FIG. 3, the heater assembly 12 comprises two tubular continuous flow heaters 19 and 20 arranged in tandem and connected with a tubular coupler 21. The course of the serially connected continuous flow heaters 19, 20 is an elongated spiral, starting at the outer end 19a and terminating at the inner end 20a.

Turning now to FIG. 4, the embodiment illustrated therein differs from the embodiment shown in FIG. 3 only in that the continuous flow heater 20 has a slightly different course. Essentially, in both embodiments the flow heater 19 forms an outer "U" in which nests the flow heater 20, forming an inner "U". The embodiments of FIGS. 3 and 4 show that the invention may be realized in a great variety of structural arrangements.

As shown in FIGS. 1 and 2, the continuous flow heaters 19 and 20 are directly installed on the underside of the hot plate 17. In this manner, the heater assembly 12 simultaneously serves the purpose of heating the water to be introduced into the filtering vessel 15 and of maintaining the pot 16 warm with the intermediary of the hot plate 17.

Figure 5:
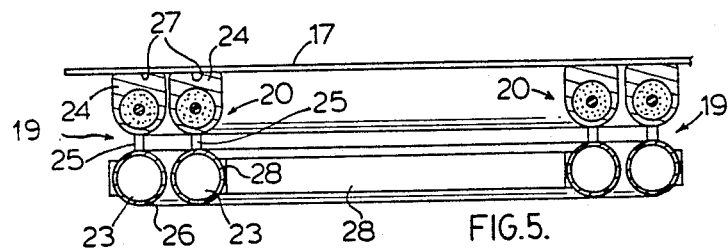
FIG. 5 is a sectional view taken along line V-V of FIG. 3.

Turning to FIG. 5, each continuous flow heater 19 and 20 has a water pipe 23, a heater jacket (tube) 24 and a heat conducting coupling web 25 which is a narrow, long strip extending between the water pipe 23 and the heater tube 24. The connecting web 25 provides for a superior heat transfer from the heater tube 24 to the water pipe 23. Advantageously, the web has a height (measured along a line connecting the longitudinal axes of the water pipe 23 and the heater tube 24) and a thickness (measured along a line which is perpendicular to the two axes) of a ratio of 2:1 to the thickness of the wall 26 of the water pipe 23.

The heater tube 24 has a flat top face 27 which is in a face-to-face contacting engagement with the underside of the hot plate 17 and which preferably has a width that is at least 4/5 of the outer diameter of the heater tube 24. This particular arrangement thus ensures that the heater tube 24 of the continuous flow heaters 19 and 20 is in a compact, superior heat transfer relationship with the hot plate 17 on the one hand and the underlying water pipe 23 on the other hand.

The outer surface of each water pipe 23 has a flattened surface portion 28 which is perpendicular to the face 27 of the heater tube 24 and which is adapted t be contacted by a thermostat device (not shown). Preferably, the width of the flat surface portion 28 is at least 4/5 of the outer diameter of the water pipe 23. Each continuous heater 19 or 20, which is thus of dual-tube construction and is formed of the water pipe 23 containing the flat surface 28, the heater tube 24 having a flat top face 27 and the interconnecting web 25 may be a single extruded component made preferably of aluminum. The particularly profiled heaters 19 and 20 permit a relatively small radius of curvature in designing the course of the heater and a superior heat transfer to the hot plate 17 by virtue of the large-surface face-to-face engagement with the heater tube 24.

Figure 6:
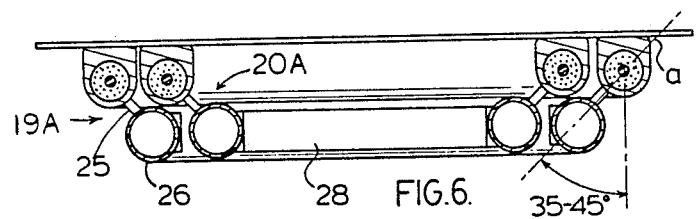
FIGS. 6, 7 and 8 are sectional views, similar to FIG. 5, of three further preferred embodiments of the invention.

While in the arrangement according to FIG. 5 each water pipe 23 extends vertically below the associated heater tube 24, in the embodiment according to FIG. 6 the imaginary line a connecting the central axis of the heater tube 24 with the central axis of the associated water pipe 23 is inclined at approximately 35°–45° to the vertical. The connecting web 25 is similarly inclined. By virtue of such an inclined, laterally offset orientation, a more efficient nesting of the two heaters 19A and 20A may be achieved, resulting in a reduced total structural height.

Figure 7:
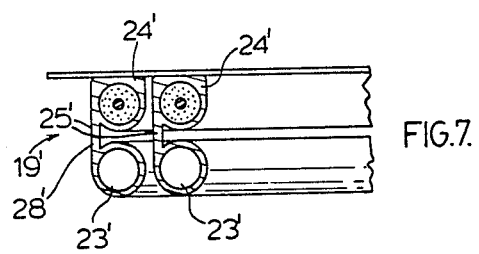
Figure 8:
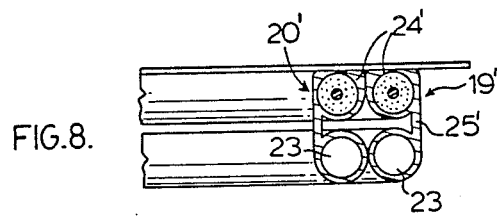

Turning now to FIGS. 7 and 8, each heater 19' and 20' has a heater tube 24' which is connected by means of a heat conducting web 25' with the water pipe 23'. The web 25' is oriented tangentially to the heater tube 24' and the water pipe 23'. The outer face 28' of the connecting web 25' is of flat configuration and, similarly to the flat surface 28 of the embodiments of FIGS. 5 and 6, serves for engaging a non-illustrated thermostat. In FIG. 7 the two heaters 19' and 20' are so arranged that the connecting web 25' is on the same (left) side of the two heaters, whereas in the FIG. 8 embodiment the connecting webs 25' are oriented away from one another, that is, they are in a mirror image arrangement.

Figure 9:
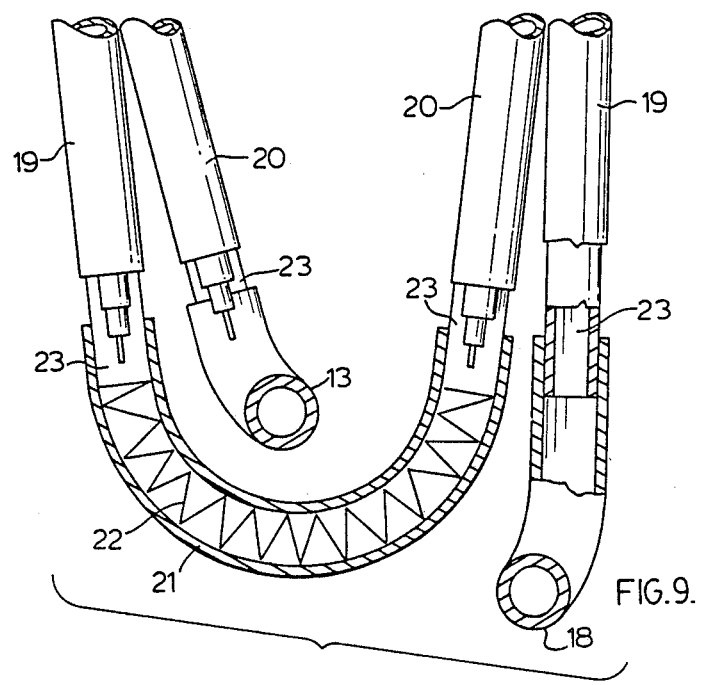
FIG. 9 an enlarged, partially sectional fragmentary bottom plan view of the structure shown in FIG. 3.

FIG. 9 illustrates in more detail the tubular coupler 21. Within the latter there are disposed internal drive means for causing turbulence of the water flowing therethrough. The internal guide or baffle means is made of a corrosion and hot water resistant material and is preferably constituted by one or more helical spring-like components 22 made of stainless steel. In the illustrated embodiment the tubular coupler 21 is a flexible hose inserted on the outlet end of the upstream heater 19 and on the inlet end of the downstream heater 20. It is a result of the turbulence causing means 22 that the water already heated in the first continuous flow heater 19 is mixed prior to being introduced into the second continuous flow heater 20, so that a more uniform and eventually more rapid heat-up of the water to the brewing temperature is achieved.

The continuous flow heaters 19 and 20 may be of identical heat output; it is feasible, however, to design them for unlike heat outputs. In case the two heaters 19 and 20 are of different heat output, the heater of the greater output should be the second or downstream heater as viewed in the direction of water flow.

Figure 10:
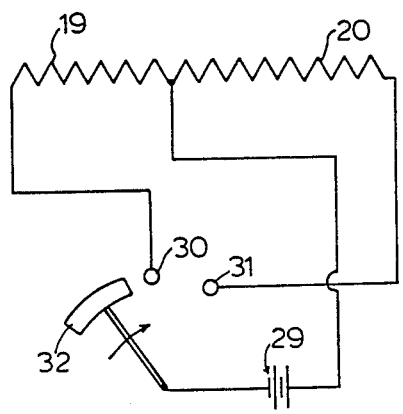
FIG. 10 is a circuit diagram of an electric control incorporated in the preferred embodiment.

The switching circuitry of the heater assembly 12 may be designed in the alternative such that either both heaters 19 and 20 are energized and de-energized simultaneously or the two heaters are selectively controlled, as illustrated in FIG. 10. This Figure shows that the two heaters 19 and 20 are electrically directly connected to one another and to a voltage source 29. The other end of the heater 19 is connected to a stationary contact 30, while the other end of the heater 20 is connected to a stationary contact 31. A rotary contact 32 is continuously connected to the voltage source 29 and may assume the following four positions: in a first or off position the rotary contact is out of engagement with both stationary contacts 30 and 31; in a second position the rotary contact 32 is in engagement only with the stationary contact 30; in a third position the rotary contact 32 is in engagement with both stationary contacts 30 and 31 whereas in a fourth position the rotary contact 32 is in engagement solely with the stationary contact 31. It is thus seen that in the first position both heaters 19 and 20 are de-energized, in the first position only the heater 19 is energized; in the second position both heaters 19 and 20 are energized whereas in the fourth position only the heater 20 is energized.

It will be understood that the above description of the present invention is susceptible to various modifications, changes and adaptations, and the same are intended to be comprehended within the meaning and range of equivalents of the appended claims.

What is claimed is:

1. In a beverage maker including a continuous flow electric heater assembly of tubular construction adapted to be connected to a source of fresh water and arranged for guiding fresh water therethrough for heating the fresh water to brewing temperatures, electric means for energizing said heater assembly, a filtering vessel and pipe means arranged to introduce heated fresh water from the heater assembly to said filtering vessel, the improvement wherein said heater assembly comprises at least two tubular continuous flow electric heaters each being bent into a U-shaped configuration; said heaters being arranged in a mutually nested relationship and each having metal heater tube containing an electrically energizable heating means, a metal water pipe extending adjacent said metal heater tube parallel therewith and spaced therefrom and a heat conducting web connecting said heater tube with said water pipe for transferring heat from the heater tube to said water pipe; further comprising tubular connecting means coupling ends of the water pipes of the heaters to one another.

2. A beverage maker as defined in claim 1, wherein said water pipe of each heater has a wall thickness; the respective heat conducting web having a height and thickness having a ratio of 2:1 to said wall thickness of said water pipe.

3. A beverage maker as defined in claim 1, wherein said heaters are generally horizontally juxtapositioned; and further wherein in each said heater the water pipe is situated vertically below the heater tube thereof.

4. A beverage maker as defined in claim 1, wherein each said heat conducting web tangentially connects the respective heater tube with the respective water pipe and extending along the length thereof.

5. A beverage maker as defined in claim 1, wherein said heater tube, said water pipe and said heat conducting web of each heater together constitute a one-piece extruded component.

6. A beverage maker as defined in claim 1, wherein said tubular connecting means comprises a flexible hose.

7. A beverage maker as defined in claim 1, wherein all of the heaters have identical heat outputs.

8. A beverage maker as defined in claim 1, wherein one of said heaters is an upstream heater and another heater is a downstream heater as viewed in the direction of water flow through the heater assembly; said downstream heater having a greater heat output than said upstream heater.

9. A beverage maker as defined in claim 1, wherein said electric means comprises circuit means for individually energizing and de-energizing said heaters.

10. A beverage maker as defined in claim 1, further comprising a hot plate; each said heater tube has a planar outer face being in a direct face-to-face heat transfer relationship with said hot plate.

11. A beverage maker as defined in claim 10, wherein each said heater tube has an outer diameter; and wherein said planar outer face has a width being at least 4/5 of said diameter.

12. A beverage maker as defined in claim 1, further wherein each said water pipe has a planar outer face extending along the length of the water pipe.

13. A beverage maker as defined in claim 12, wherein each said heater tube has an outer diameter; and wherein said planar outer face has a width being at least 4/5 of said diameter.

14. A beverage maker as defined in claim 1, wherein said heaters are generally horizontally juxtapositioned; and further wherein in each said heater the water pipe is situated laterally offset below the heater tube thereof.

15. A beverage maker as defined in claim 14, wherein the lateral offset is 45°.

16. A beverage maker as defined in claim 14, further comprising a horizontal hot plate; further wherein said heater tubes extend in a horizontally juxtapositioned relationship and each is in a direct heat transfer relationship with said hot plate; said water pipes extending in a horizontally juxtapositioned relationship.

17. A beverage maker as defined in claim 1, further comprising water guide means accommodated in said tubular connecting means for causing turbulence of the water flowing therethrough to intermix the water between said heaters.

18. A beverage maker as defined in claim 17, wherein said water guide means comprise corrosion and hot water resistant baffle elements.

19. A beverage maker as defined in claim 18, wherein said baffle elements comprise a helical spring-like component.

20. A beverage maker as defined in claim 1, wherein said heaters are generally horizontally juxtapositioned and further wherein in each said heater the water pipe is situated below the heater tube thereof.

* * * * *